Figure 1:
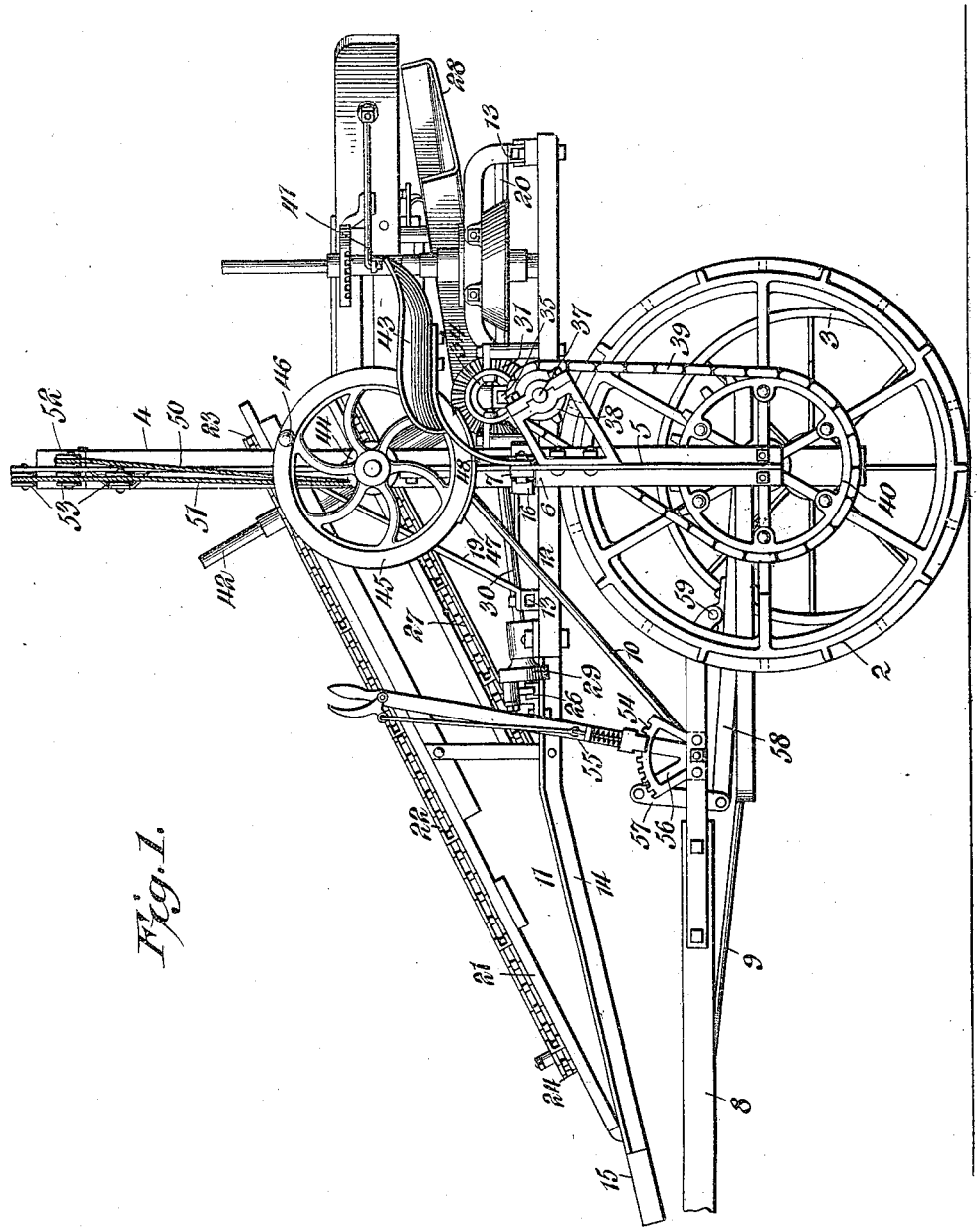

W. T. WENTZ.
KAFIR CORN HARVESTER AND BINDER.
APPLICATION FILED APR. 30, 1915.

1,204,328.

Patented Nov. 7, 1916.
4 SHEETS—SHEET 1.

WITNESSES:

William T. Wentz, INVENTOR

BY

Attorney

W. T. WENTZ.
KAFIR CORN HARVESTER AND BINDER.
APPLICATION FILED APR. 30, 1915.

1,204,328.

Patented Nov. 7, 1916.
4 SHEETS—SHEET 3.

WITNESSES:
Howard D. Orr.
F. T. Chapman

William T. Wentz, INVENTOR,

BY E. G. Siggers.

Attorney

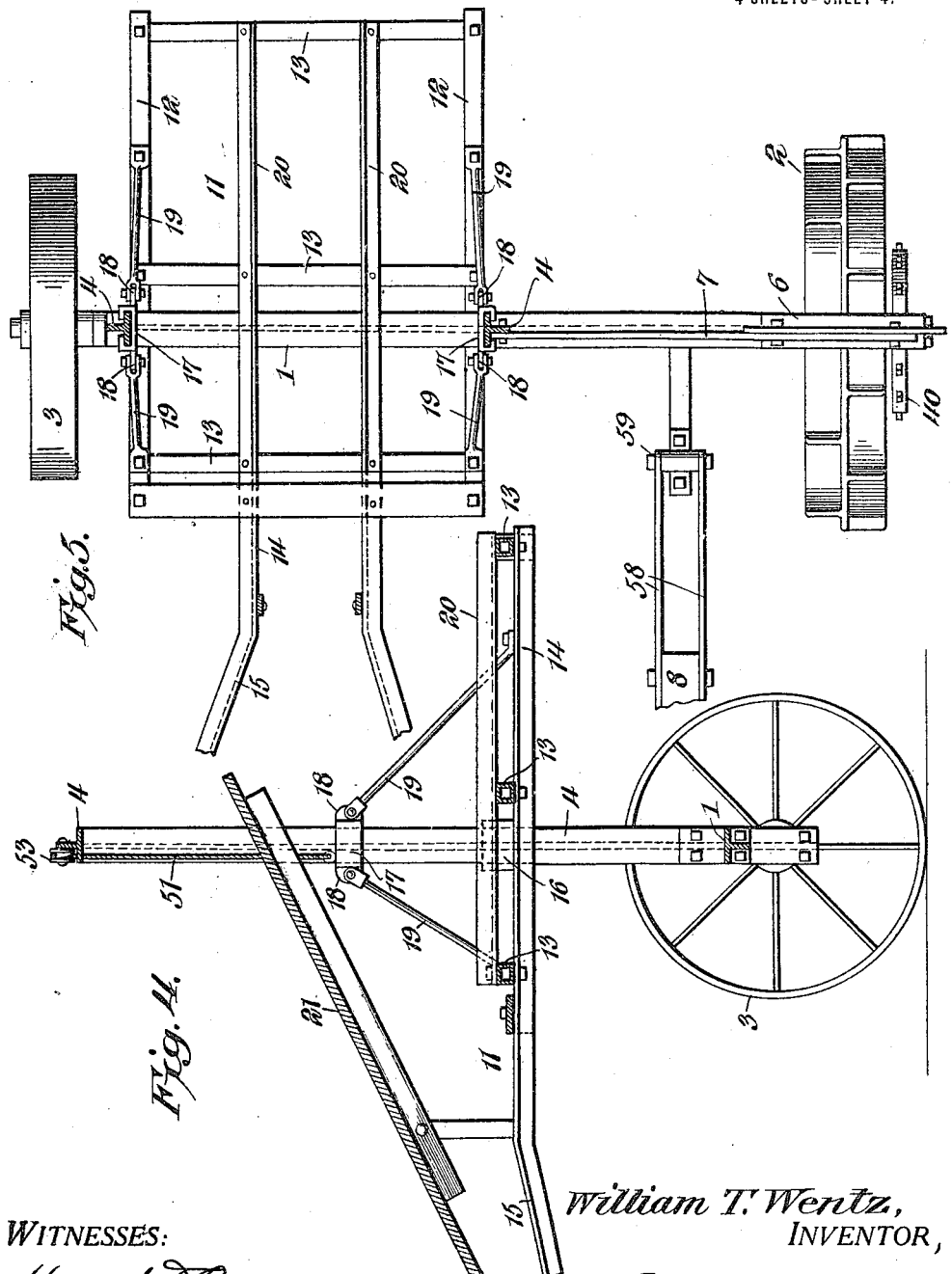

UNITED STATES PATENT OFFICE.

WILLIAM T. WENTZ, OF LEON, KANSAS.

KAFIR-CORN HARVESTER AND BINDER.

1,204,328.                     Specification of Letters Patent.        Patented Nov. 7, 1916.

Application filed April 30, 1915. Serial No. 25,029.

*To all whom it may concern:*

Be it known that I, WILLIAM T. WENTZ, a citizen of the United States, residing at Leon, in the county of Butler and State of Kansas, have invented a new and useful Kafir-Corn Harvester and Binder, of which the following is a specification.

This invention has reference to Kafir corn harvesters and binders, and its object is to provide a harvester which will head and bind Kafir corn and maize of all kinds in relatively short bundles.

In accordance with the present invention there is provided a gatherer, a header, and a binder, in the order named, all of which are mounted for simultaneous up and down adjustment. The machine may therefore be driven through a field of Kafir corn, maize, or the like, and by suitable adjustment, which may range from twenty to sixty inches from the ground, the material is headed and the heads are then formed into bundles and bound, such operation being possible while the heads are ripe, so that they may cure in the bundle or in shocks and are then ready for threshing without reheading.

The machine of the present invention has the advantage of leaving the stalks standing in the field, which stalks make good pasture and fertilizer, and therefore there is a material saving in labor.

With the binder of the present invention, it is possible to bind the Kafir corn or the like in bundles as short as eighteen inches or as long as three feet or more. The bundles contain only the heads and blades of the stalk. The gathering and cutting parts of the machine, as well as the binder, may be lowered so as to cut twenty inches or less from the ground, or they may be raised so as to cut as high as say, five feet from the ground. The binder can be raised or lowered about three feet while at work. Binders as ordinarily constructed cut close to the ground, and the stalks must be reheaded before ready to thresh.

While it is in most cases desirable to have the stalks left on the field, this can be done by means of a header, but headers as heretofore constructed do not bind the material they cut. The result is that it is customary to wait until after frost in order that the grain may be dry enough to stack. Oftentimes the weather is wet and windy when the grain has become dry enough, wherefore the grain falls over and must be picked up by hand.

By the present invention the heads are cut and bound and cured in the bundle before frost and before the stalks fall over, combining the advantages of heading and bundling and eliminating the disadvantages of both procedures as customarily practised.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

Figure 2:
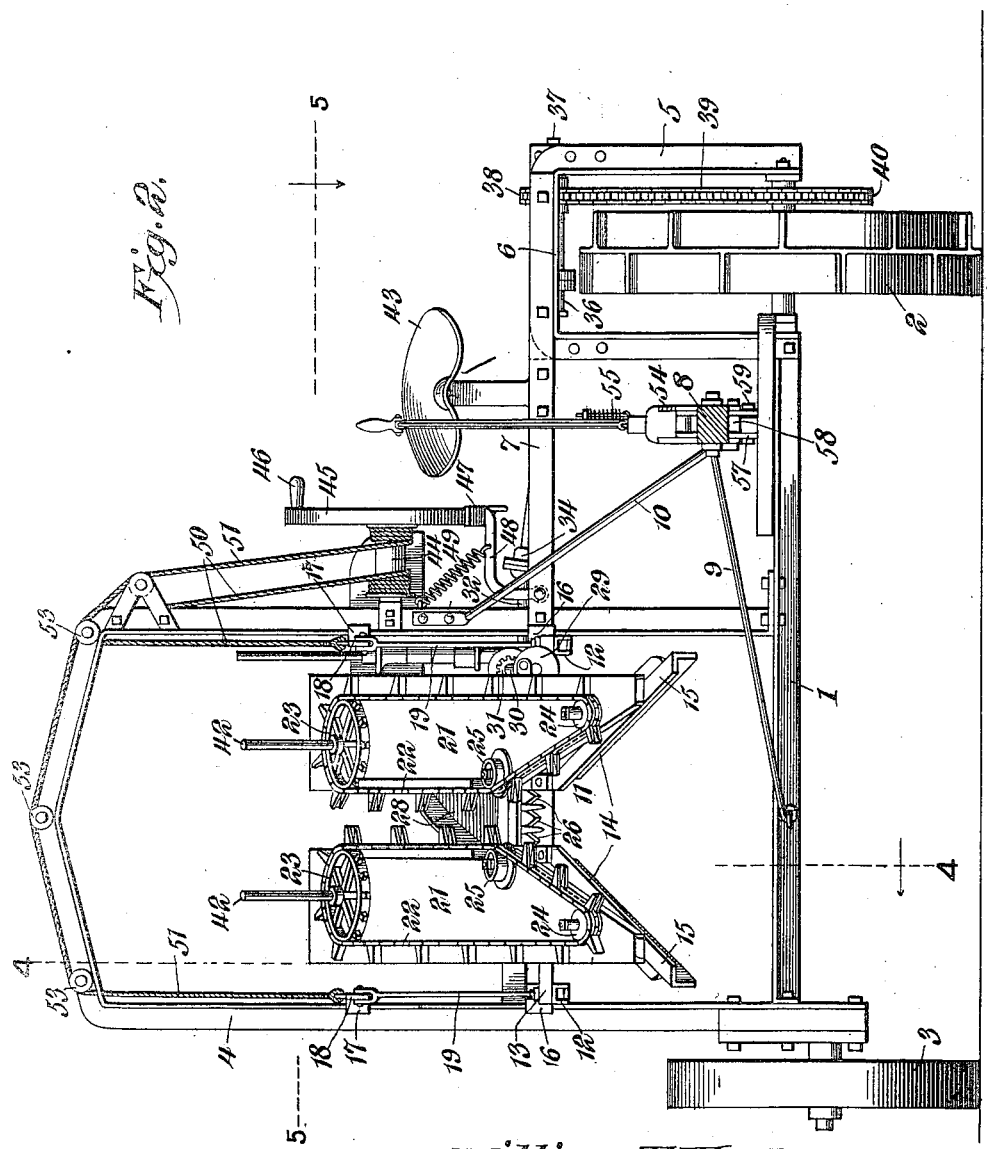
Figure 3:
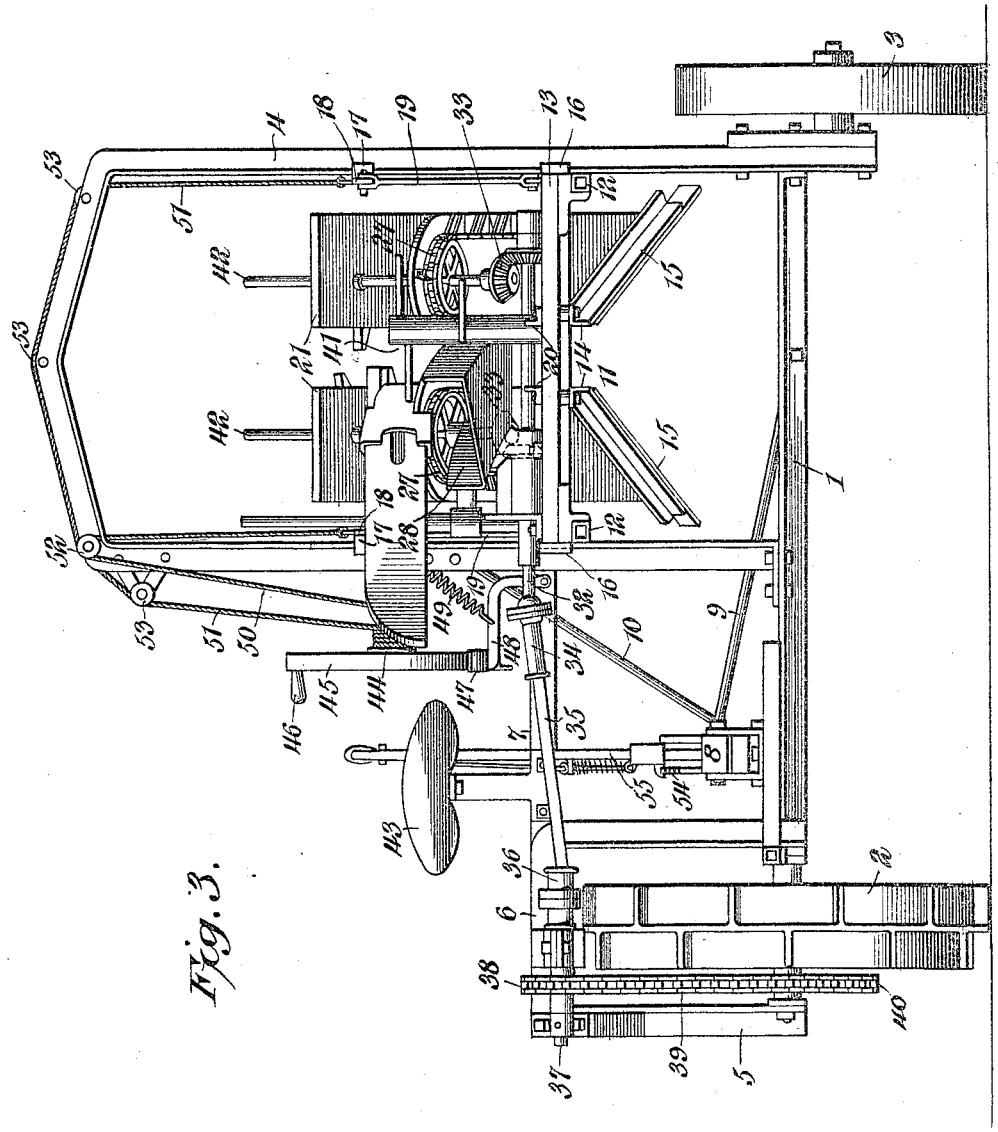

In the drawings: Figure 1 is a side elevation of a combined harvester and binder for Kafir corn. Fig. 2 is a front elevation with the tongue shown in cross section. Fig. 3 is a rear elevation of the machine. Fig. 4 is a section on the line 4—4 of Fig. 2 with parts omitted. Fig. 5 is a section on the line 5—5 of Fig. 2 with parts omitted.

Referring to the drawings, there is shown an axle 1 having mounted thereon at one end a drive wheel 2, and at the other end a supporting or ground wheel 3. Erected on the axle is an arch 4 rising to an appropriate height with the legs of the arch sufficiently spaced apart to accommodate certain mechanism to be described. The arch 4 is located nearer to the wheel 3 than to the wheel 2, thus leaving space for certain parts to which reference will hereinafter be made. The drive wheel 2 rotates in another arch 5 of sufficient height to bring its yoke portion indicated at 6 above the drive wheel, and this yoke portion of the arch 5 is connected by a bar 7 to the adjacent leg of the arch 4, whereby the arches are strengthened.

The axle 1, arches 4 and 5, and connecting bar 7 may all be made of T-iron or some other form of structural metal. Attached to the frame and to the axle 1 between the arches 4 and 5 is a draft pole 8, and this pole is connected by a brace rod or bar 9 to the axle 1 at the point intermediate of the arch 4, and is furthermore connected by another brace rod 10 to a relatively high point on the arch 4 whereby the parts are made as firm and rigid as needed.

Movable up and down within the arch is a frame 11 having side bars 12 and cross bars 13. This frame projects both to the front and to the rear of the arch 4, which latter in the direction of its width extends lengthwise of the axle, and therefore crosswise of the machine. The frame 11 has intermediate longitudinal bars 14 between the side bars 12 and these bars 14 have forward divergent continuations 15 slanting downwardly.

At opposite sides the frame 11 has clips 16 fast thereto in embracing relation to oppositely disposed webs of the upright T-bars of the arch 4. At higher points on the T-bars forming the side legs of the arch 4 are other clips 17, which may be similar to the clips 16. The clips 17 have lugs 18 on opposite sides, to which lugs are fastened brace rods 19, each secured at the end remote from the lug 18 to the frame 11 by a cross bar 13 or by some other part fast to and carried by the frame, as for instance, a longitudinally disposed side bar 12 on the frame 11.

Mounted on and carried by the frame 11 are gatherer boards 21, on which travel gatherer chains 22 extending about drive wheels 23, and direction-change wheels 24 and 25. The gathering mechanism thus constituted may be the same or similar to gathering mechanism usually employed in Kafir corn harvesters, and needs no particular description. The bars 15 where they approach constitute the mouth of the gatherer, and where they change into substantial parallelism they constitute the throat of the gatherer, at which point cutting blades 26 are located, and are designed to sever the heads from the stalks, as such heads are directed to the throat of the gatherer. Underneath the gatherers 21, 22 are other similar gatherers 27 arranged in the manner customary in apparatus of this character, while the heads, where severed, ultimately reach a trough 28 upon which they are directed. The cutters 26 are driven by a crank disk 29 on a shaft 30 mounted on the frame 11 and terminating, at the end remote from the crank disk, in gearing connections 31 on a shaft 32 extending across the frame 11 and also having gearing connections 33 with the drive wheels 23. The shaft 32 has a sliding joint connection 34 with a shaft extension 35 provided with a universal joint connection 36 to a counter shaft 37 on which is mounted a sprocket wheel 38 connected by a sprocket chain 39 to another sprocket wheel 40 fast to the drive wheel 2. The drive connections described may follow the usual construction employed in headers and other harvesters, except that provision is made for the great extent of up and down movement of the frame 11 and parts carried thereby.

Back of the gatherer and mounted on the frame 11 is a binding mechanism indicated at 41. This binding mechanism may be such as is customarily employed in binders, and hence needs no particular description. The drive wheels 23 are mounted on shafts 42.

Mounted on the beam 7 is a seat 43 in convenient relation to the pole 8 for the control of the draft animals. Mounted on the arch 4 at the side thereof adjacent to the seat 43 is a winding drum 44 having a disk 45 fast thereto with a handle 46 on the disk within reach of an operator on the seat 43, so that the operator may turn the drum 44 by means of the handle 46 and disk 45 whenever desired. Arranged to engage the rim of the disk 45 is a brake shoe 47 carried by a pivoted arm 48 mounted on the beam 7 and under the control of a spring 49, so that the drum 45 may be turned whenever desired by the operator, and will hold the position to which it is moved. On the drum are wound the ends of two ropes or strands 50 and 51. The rope or strand 50 is carried over a direction-changing pulley 52 at the top portion of the arch 4, and thence downwardly adjacent to that side of the arch toward the seat, and is connected to the corresponding clip 17 carrying the bars 19 spanning the corresponding side of the frame 11. The strand or rope 51 is carried over direction-changing pulleys 53 on the upper or yoke portion of the arch and down that side of the arch remote from the seat 43, and is ultimately connected to the clip 17 sustaining the rods 19 in turn supporting the corresponding side of the frame 11. By this means the operator is able to raise or lower the frame 11 and bars carried thereby at will, even while the harvester and binder is being driven through the field, and is in operation. The extent of raising and lowering is determined by the height of the arch 4 and the demands of the crop. The pole 8 may have its relation to the vehicle changed in order that the pitch of the gatherer may be varied as desired, and for this purpose the pole carries a rack segment 54 at the center of which there is pivotally mounted a latch and lever 55 in coöperative relation with the rack segment. This lever carries an arm 56 connected by a link 57 to another arm 58 mounted on the axle 1, while the pole is connected to the arm 58 by a pivot connection 59. The arrangement is such that by an appropriate movement of the lever 55 the angular relation of the pole to the machine is changed in a vertical plane.

If it be assumed that the machine is in use and being driven through a field of Kafir corn or maize or the like, the stalks are engaged by the gatherer and are directed to the cutter at the receiving throat of the gatherer, where the heads are severed from the standing stalks, and this may be done while the stalks are green. The height of the gatherer and the relation of the gatherer to the binding mechanism are adjusted in accordance with the condition of the crop, and the adjustment for height of the binder and gatherer together may be varied even while the machine is in operation by a suitable manipulation of the winding drum 44. The severed heads are accumulated by the binder in the usual manner, and are bound into bundles. The great extent of adjustment for height permits the adaptation of the machine to a large variety of conditions of crop and the possibility of adaptation of the machine to produce bundles of various lengths permits the further adaptation of the machine to various crops. The bundles may be deposited upon the ground at the rear of the machine as is customary, and the bundles are stacked up into shocks for drying. Because of this capability it is possible to head the Kafir corn or maize or the like and bundle it for drying in the shock, instead of being compelled to either cut the grain close to the ground or to await the drying of the grain while still on the stalk before cutting.

By the present invention grain is harvested and bundled in short bundles suitable for threshing without reheading and the stubble is left on the field at the same height that is obtainable with heading machines.

For convenience of description the name Kafir corn is employed in the claims, and is to be considered as descriptive of maize and other grains or other materials for the harvesting and bundling of which the hereinbefore described machine is adapted.

What is claimed is:

1. A Kafir corn header and binder, comprising a vehicle provided with a main frame and wheels carrying the frame, another frame rising from the main frame in fixed relation thereto, a carrier within the second frame and movable up and down therein, means for raising and lowering the carrier with respect to the second frame and to the vehicle, and a header, a gatherer, and a binder in coactive relation one to the other and all mounted on the carrier for up and down movement as a unit therewith.

2. A Kafir corn header and binder, comprising a vehicle having a main frame and wheels, an arch frame on and rising from the main frame, another frame mounted on the arch frame and movable up and down therein and extending forwardly and rearwardly of the arch frame, elevating and lowering means for the third-named frame connected to opposite sides thereof and extending over the arch frame to a common point of manipulation at one side of the arch frame, and gathering, heading and binding devices on the third-named frame in coöperative relation to each other and movable up and down as a unit with the third-named frame.

3. A Kafir corn header and binder, comprising a vehicle, an upright arch frame mounted thereon, a carrier mounted on the arch frame and slidable up and down therein and provided with forward divergent continuations, gathering means carried by the forward divergent continuations, heading mechanism mounted on the carrier at the rear of and in coöperative relation to the gathering means, binding mechanism mounted on the carrier to the rear of the gathering and heading mechanism and in coöperative relation thereto, the gathering, heading and binding mechanisms all being supported by and movable simultaneously with the carrier as a unit, and means on the arch frame for supporting, elevating and lowering the carrier.

4. A Kafir corn header and binder, comprising a vehicle, an upright arch frame mounted thereon, a carrier mounted on the arch frame and slidable up and down therein and provided with forward divergent continuations, gathering means carried by the forward divergent continuations, heading mechanism mounted on the carrier at the rear of and in coöperative relation to the gathering means, binding mechanism mounted on the carrier to the rear of the gathering and heading mechanism and in coöperative relation thereto, the gathering, heading and binding mechanisms all being supported by and movable simultaneously with the carrier as a unit, and means on the arch frame for supporting, elevating and lowering the carrier, said last-named means comprising a winding drum at one side of the arch frame, and flexible strands leading to opposite sides of the carrier and having supporting and directing devices for the strands for guiding the latter over the arch of the arch frame.

5. A Kafir corn header and binder, comprising a vehicle, an arch frame on and rising from the vehicle at one side of the latter, another frame constituting a carrier and extending forwardly and rearwardly from the arch frame and connected to the latter at an intermediate point of the length of the carrier for sliding movements up and down on the arch frame, a winding drum on one side of the arch frame, flexible strands extending along the uprights of the arch frame and across the top thereof to opposite sides of the carrier and also connected to the winding drum for raising and lowering the carrier by manipulation of the drum, a gatherer, a header, and binding mechanism all mounted on the carrier and simultaneously participating to like extents in the up and down movements of the carrier on the manipulation of the winding drum.

In testimony that I claim the foregoing as my own, I have hereto affixed my signature in the presence of two witnesses.

WILLIAM T. WENTZ.

Witnesses:
WM. HARDESTY,
A. T. LANICK.

Copies of this patent may be obtained for five cents each, by addressing the "Commissioner of Patents, Washington, D. C."